J. G. SCHMIDT.
Faucet.
No. 204,847.  Patented June 11, 1878.
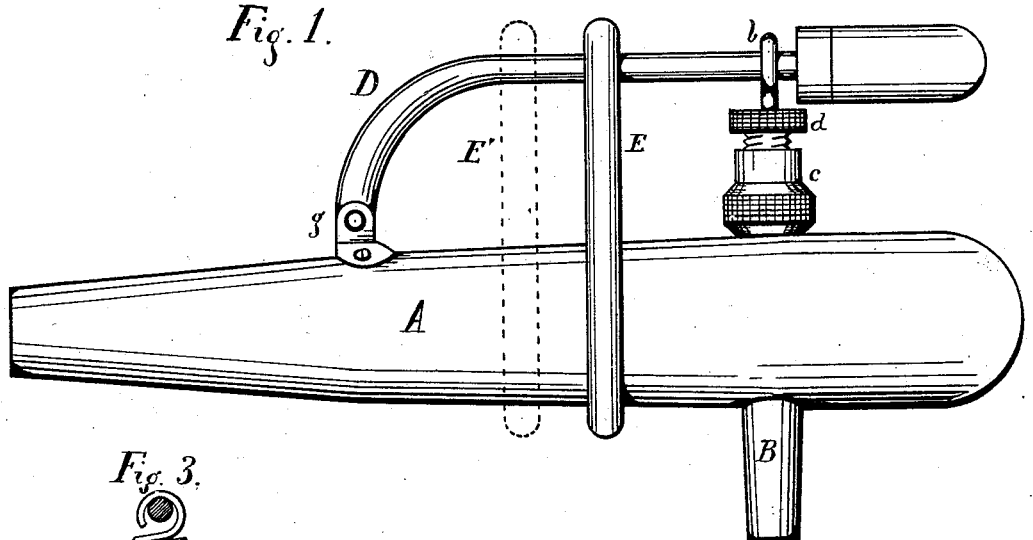
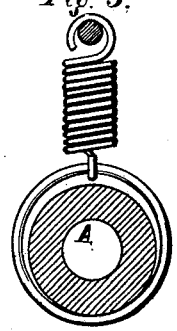
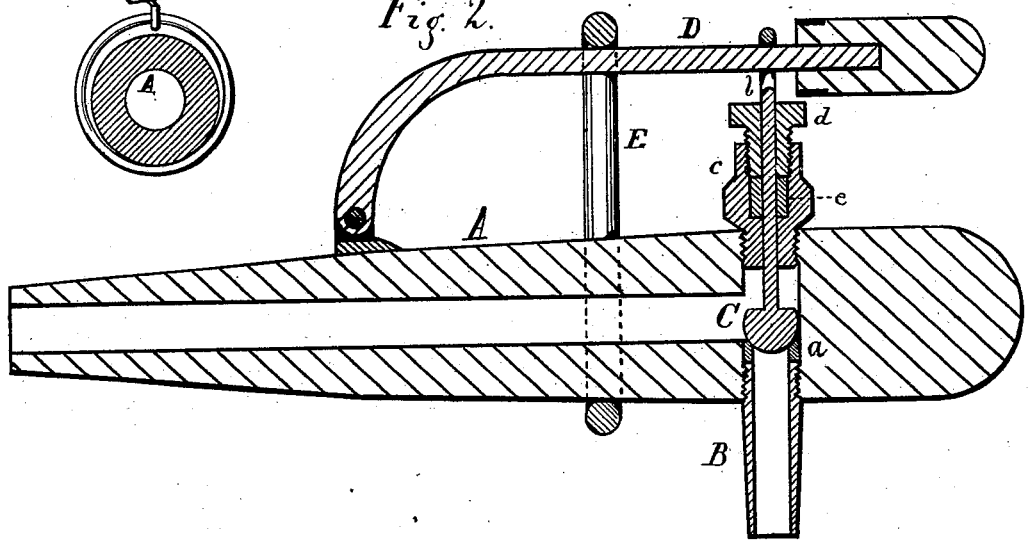
Witnesses:
Inventor:
John G. Schmidt.

UNITED STATES PATENT OFFICE.

JOHN G. SCHMIDT, OF ROCHESTER, NEW YORK.

IMPROVEMENT IN FAUCETS.

Specification forming part of Letters Patent No. 204,847, dated June 11, 1878; application filed March 12, 1878.

*To all whom it may concern:*

Be it known that I, JOHN G. SCHMIDT, of the city of Rochester, New York, have invented an Improvement in Self-Closing Ale and Beer Faucets, of which the following is a specification:

The object of my invention is the production of a self-closing faucet for ale and beer kegs, which shall be simple in construction and cheap in price; and it consists, in substance, in the combination of a wooden faucet-body with a metallic outlet-pipe at right angles thereto, said pipe being closed at its inner end by a valve provided with a valve-stem attached to a hand-lever, which is controlled by a spring made longitudinally adjustable upon the faucet-body.

It also consists in the arrangement and combination of the various parts.

In the accompanying drawings, Figure 1 is an elevation of a faucet embracing my improvements, and Fig. 2 a central vertical section through the same. Fig. 3 represents one of the modes of arranging the spring.

A is the faucet-body, made of any suitable wood, tapered at one end in order that it may be driven tightly into the keg to which it is to be adapted, and bored partially through on the line of its axis. B is the outflow-pipe, which is screwed into the body A at or near the end of the passage made in it. At the upper end of the pipe B is placed a valve-seat, $a$, formed of a ring of rubber or other suitable material. This rubber ring is supported laterally by the wooden faucet-body, and rests upon the inner end of the pipe B.

The spherical valve C is forced down upon the valve-seat by means of the stem $b$, lever D, and spring E. The spring E may be either a rubber ring passing around the body of the faucet and the lever D, or it may be a spiral-wire spring, arranged as shown in Fig. 3.

In either case the pressure of the valve C on its seat may be varied by adjusting the position of the spring longitudinally on the faucet-body A, as represented in dotted lines at E′, Fig. 1.

The valve-stem $b$ is packed by means of the gland $c$, which is screwed into the body of the faucet on the opposite side from the pipe B, and is provided with the screw-follower $d$, which compresses the packing $e$ upon the valve-stem. The valve-stem $b$ is attached to the lever D by being bent around it, or in any other convenient way. The lever D is provided with a suitable handle, and its inner end is pivoted on the body of the faucet at $g$.

I claim—

1. The combination of the body A, pipe B, valve C, valve-stem $b$, provided with stuffing-box $e$, lever D, and the spring E, arranged to be adjusted longitudinally upon the body A, substantially as set forth.

2. The combination of the body A, valve C, closed by a spring, pipe B, valve-seat $a$, within the body A and resting upon the pipe B, substantially as set forth.

JOHN G. SCHMIDT.

Witnesses:
 J. M. JONES,
 A. R. SELDEN.